(12) United States Patent
Aromin

(10) Patent No.: US 9,356,440 B2
(45) Date of Patent: May 31, 2016

(54) LEAKAGE CURRENT DETECTION AND INTERRUPTION (LCDI) DEVICE WITH IGNITION CONTAINMENT FEATURES

(71) Applicant: Victor V Aromin, West Warwick, RI (US)

(72) Inventor: Victor V Aromin, West Warwick, RI (US)

(73) Assignee: TOWER Manufacturing CORP., Providence, RI (US)

( * ) Notice: Subject to any disclaimer, the term of this patent is extended or adjusted under 35 U.S.C. 154(b) by 147 days.

(21) Appl. No.: 14/163,825

(22) Filed: Jan. 24, 2014

(65) Prior Publication Data

US 2015/0214721 A1    Jul. 30, 2015

(51) Int. Cl.
*H02H 3/00* (2006.01)
*H02H 7/00* (2006.01)
*H02H 3/16* (2006.01)
*H02H 1/00* (2006.01)
*H02H 9/08* (2006.01)

(52) U.S. Cl.
CPC ............. *H02H 3/167* (2013.01); *H02H 1/0015* (2013.01)

(58) Field of Classification Search
CPC ....... H02H 1/0007; H02H 3/16; H02H 3/167; H02H 1/0015
USPC ........................................ 361/42, 2
See application file for complete search history.

(56) References Cited

U.S. PATENT DOCUMENTS

| | | |
|---|---|---|
| 3,366,843 A | 1/1968 | Evalds |
| 3,569,781 A | 3/1971 | Strachan |
| 3,653,223 A | 4/1972 | Jones et al. |
| 3,728,702 A | 4/1973 | Miyamoto et al. |
| 3,936,699 A | 2/1976 | Adams |
| 4,428,635 A | 1/1984 | Hamsher, Jr. et al. |
| 4,468,073 A | 8/1984 | Machcinski |
| 4,720,275 A | 1/1988 | Swart et al. |
| 5,148,344 A | 9/1992 | Rao et al. |
| 5,183,413 A | 2/1993 | Lazaro, Jr. et al. |
| 5,320,558 A | 6/1994 | von Roretz |
| 5,642,248 A | 6/1997 | Campolo et al. |
| 5,757,598 A | 5/1998 | Aromin |
| 5,943,199 A | 8/1999 | Aromin |
| 6,052,266 A | 4/2000 | Aromin |
| 6,122,155 A | 9/2000 | Aromin et al. |
| 6,181,541 B1 | 1/2001 | Souri et al. |
| 6,210,208 B1 | 4/2001 | Barnes et al. |
| 6,218,647 B1 | 4/2001 | Jones |

(Continued)

FOREIGN PATENT DOCUMENTS

EP          0831570         3/1998
WO     WO-2010/011321      1/2010

OTHER PUBLICATIONS

US 8,072,717, 12/2011, Radosavljevic et al. (withdrawn)

*Primary Examiner* — Thienvu Tran
*Assistant Examiner* — Lucy Thomas

(57) ABSTRACT

A leakage current detection and interruption (LCDI) device, for use as a safety device for a cable connecting, a power source with a load. The LCDI having a safety circuit that senses the presence of an arcing condition between one of the conducting lines and a metal sheath, and in response thereto, opens at least one of the conducting lines between the power supply and the load. The structure of the LCDI circuit card assembly incorporates a load input cavity having fire retardant materials surrounding the load input terminals, and further includes a contact actuator which encases the switch or contact arm at the source input section of the LCDI.

16 Claims, 17 Drawing Sheets

(56) References Cited

U.S. PATENT DOCUMENTS

| | | |
|---|---|---|
| 6,525,914 B1 | 2/2003 | Legatti |
| 6,541,723 B1 | 4/2003 | Rao et al. |
| 6,738,241 B1 | 5/2004 | Aromin |
| 6,802,741 B1 | 10/2004 | Shatkin |
| 6,829,123 B2 | 12/2004 | Legatti et al. |
| 6,963,477 B2 | 11/2005 | Ikeda |
| 6,991,495 B1 | 1/2006 | Aromin |
| 7,179,992 B1 | 2/2007 | Packard et al. |
| 7,358,443 B2 | 4/2008 | Shatkin et al. |
| 7,358,654 B2 | 4/2008 | Aromin |
| 7,419,405 B1 | 9/2008 | Landes et al. |
| 7,423,854 B2 | 9/2008 | Gandolfi et al. |
| 7,501,926 B2 * | 3/2009 | Watchorn ............ H01H 37/5409 337/113 |
| 7,525,777 B2 | 4/2009 | Aromin |
| 7,672,098 B2 * | 3/2010 | Zhang .................. H01R 13/665 174/521 |
| 7,684,162 B2 | 3/2010 | Musat et al. |
| 7,753,692 B2 * | 7/2010 | Hsu ...................... H01R 12/714 439/70 |
| 8,475,136 B2 | 7/2013 | Jayanth |
| 8,493,697 B2 | 7/2013 | Wallmeir |
| 2003/0095023 A1 * | 5/2003 | Markwardt ............. H01F 27/02 336/90 |
| 2004/0070899 A1 | 4/2004 | Gershen et al. |
| 2011/0095621 A1 | 4/2011 | Petersen |

\* cited by examiner

LEAKAGE CURRENT DETECTION AND INTERRUPTION (LCDI) DEVICE WITH IGNITION CONTAINMENT FEATURES

BACKGROUND

1. Field of Use

The present invention relates generally to electrical safety devices and more particularly to a Leakage Detection and Interruption (LCDI) device having ignition containment features.

2. Description of Prior Art

Conventional electrical appliances typically receive alternating current (AC) power from a power supply, such as an electrical outlet, through a pair of conducting lines. The pair of conducting lines, often referred to as the line and neutral conductors, enable the electrical appliance, or load, to receive the current necessary to operate.

A power cable typically comprises at least two conducting lines through which current travels from the power source to the load. Specifically, a power cable typically comprises a power line and a neutral line. A metal sheath can be used to surround the power line and the neutral line in order to provide the power cable with arc sensing capabilities.

The connection of an electrical appliance to a power supply through a pair of conducting lines can create a number of potentially dangerous conditions. In particular, there exists the risk of ground fault and grounded neutral conditions in the conducting lines. A ground fault condition occurs when there is an imbalance between the currents flowing in the power and neutral lines. A grounded neutral condition occurs when the neutral line is grounded at the load.

Ground fault circuit interrupters are well known in the an and are commonly used to protect against ground fault and grounded neutral conditions. A ground fault circuit interrupter (GFCI) typically comprises a differential transformer with opposed primary windings, one primary winding being associated with the power line and the other primary winding being associated with the neutral line. If a ground fault condition should occur on the load side of the GFCI, the two primary windings will no longer cancel, thereby producing a flux flow in the core of the differential transformer. This resultant flux flow is detected by a secondary winding wrapped around the differential transformer core. In response thereto, the secondary winding produces a trip signal which, in turn, serves to open at least one of the conducting lines between the power supply and the load, thereby eliminating the dangerous condition.

While GFCI circuits of the type described above are well known and widely used in commerce to protect against ground fault and grounded neutral, conditions, it should be noted that a power cable is susceptible to other types of hazardous conditions which are not protected against by a conventional GFCI circuit. As an example, it has been found that one type of arcing condition can occur between one of the conducting lines and the metal sheath which surrounds the conducting lines. It should be noted that the presence of this type of arcing condition between either the power line and the metal sheath or the neutral line and the metal sheath can result in a fire or other dangerous condition.

When an electrical spark jumps between two conductors or from one conductor to ground the spark represents an electrical discharge through the air and is objectionable because beat is produced as a byproduct of this unintentional "arcing" path. Such arcing faults are a leading cause of electrical fires. Arcing faults can occur in the same places that ground faults can occur—in fact, a ground fault would be called an arcing fault if it resulted in an electrical discharge, or spark, across an air gap. Arc fault detection is typically accomplished by monitoring the electrical current flow into a load and comparing the profile of this current flow to a characteristic "signature' that arcing faults will exhibit it is known for ALCI enclosures to "burn up" during an internal fire or ignition creating extreme hazards and dangerous conditions.

In U.S. Pat. No. 7,525,777, to Aromin, V, incorporated herein by reference for all it discloses, new and improved safety circuits for a power cables are disclosed. The power cable includes two or more conducting lines and a metal sheath surrounding the conducting lines. The safety circuits sense the presence of an arcing condition between one of the conducting lines and the metal sheath, and in response thereto, opens at least one of the conducting lines between the power supply and the load.

Although a variety of safety circuits are available to shut down an ALCI is response to hazardous arcing conditions there is a need for an ALCI that can contain "burn up" during an internal fire through the use of fire retardant materials and structure located on the circuit assembly.

BRIEF SUMMARY

The foregoing and other problems are overcome, and other advantages are realized, in accordance with the presently preferred embodiments of these teachings. In accordance with one embodiment of the invention a Leakage Current Detection and Interruption Device (LCDI) with Ignition Containment features is disclosed.

The structure of the LCDI circuit card assembly incorporates a load input cavity having fire retardant materials surrounding the load input terminals, and further includes a contact actuator which encases the switch or contact arm at the source input section of the LCDI. Further, the particular placement of components on the circuit card assembly is to maximize the fire containment features of the LCDI. The circuit card assembly incorporates either 120 Volt, 240 Volt 15 Amp, or 240 Volt 20 Amp source input conductors.

Components and circuit traces mounted and or adhered to the LCDI Circuit Card assembly are configured to minimize packaging density while simultaneously maximizing distances between component and circuit traces to conform to required safety standards, e.g., UL840, to prevent electric arcing, and dielectric breakdown. A safety circuit for a power cable is included and disposed on the circuit assembly which includes two or more conducting lines and a metal sheath surrounding the conducting lines.

The safety circuit senses the presence of an arcing condition between one of the conducting lines and the metal sheath, and in response thereto, opens at least one of the conducting lines between the power supply and the load. The safety circuit and circuit card assembly may be mass produced, has a minimal number of parts, and can be easily assembled.

The safety circuit is for use with a power cable, said power cable connecting a power source with a load, said power cable comprising a power line, a neutral line and a metal sheath which surrounds the power line and the neutral line, said safety circuit comprising a circuit breaker comprising a first switch located in one of said lines between the power source and the load, said switch having a first position in which the power source in its associated line is connected to the load and a second position in which the power source in its associated line is not connected to the load, a circuit opening, device for setting said switch in either its first position or its second position, said circuit opening device being operable in either a first state or a second state, said circuit opening device setting said switch in its first position when in its first state and said circuit opening device setting said switch in its second position when in its second state, a first silicon controlled rectifier (SCR) for detecting the presence of an arcing condition between one of said lines and the metal sheath, said first SCR setting said circuit opening device at its second state upon detecting the presence of an arcing condition between one of said lines and the metal sheath.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1:
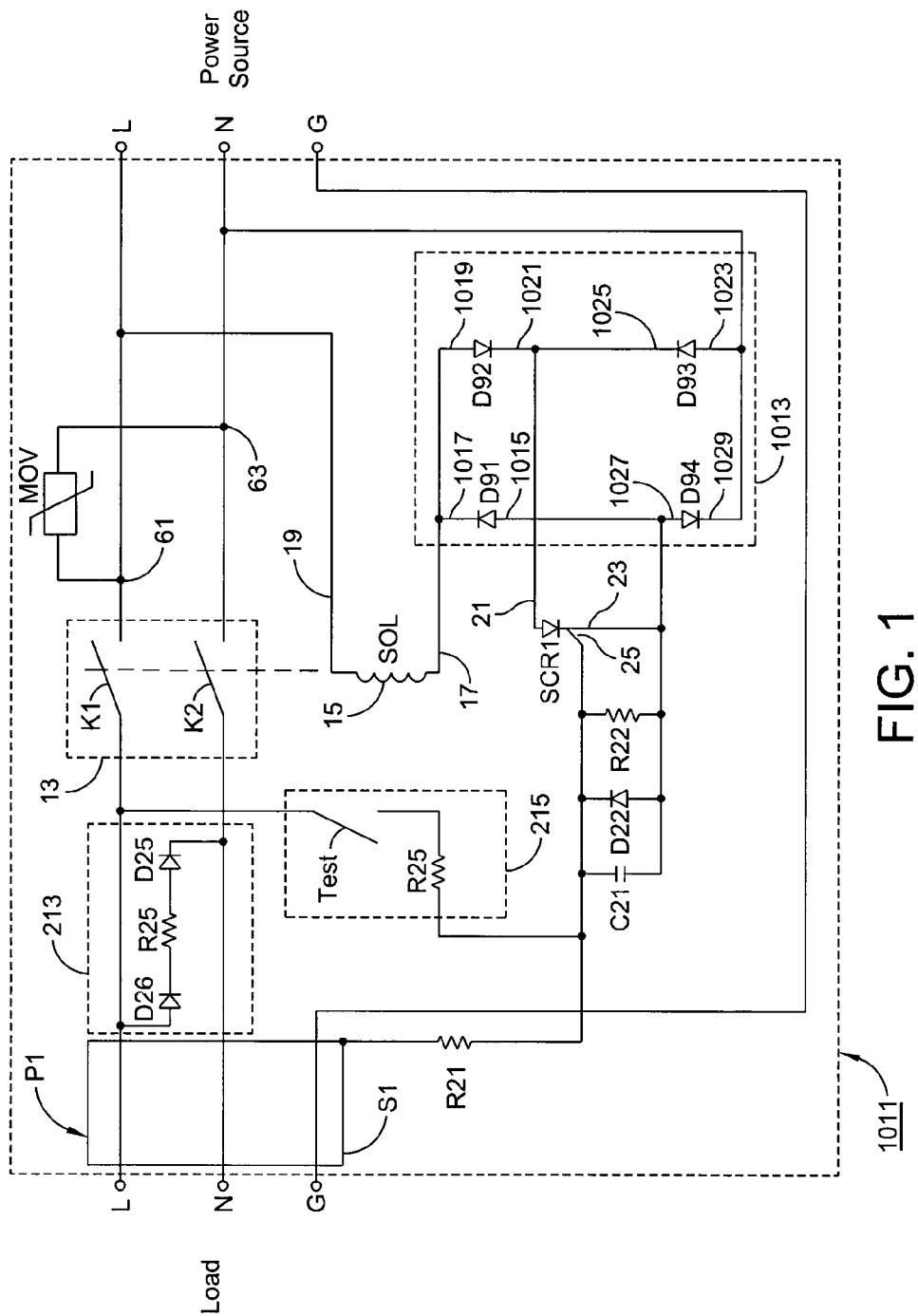
FIG. 1 is a schematic circuit diagram of an embodiment of a safety circuit used in the Leakage Current Detection and Interruption Device (LCDI) of the present invention.

Referring now to FIG. 1 there is shown a first embodiment of a safety circuit constructed according to the teachings of the present invention, the safety circuit being represented generally by reference numeral 1011. Safety circuit 1011 is designed principally for use as a safety device for a power cable P which connects a power source (i.e., a line) to a load, said power cable P including a power line L, a neutral line N, and a ground line G. Each of the power and neutral lines L and N is wrapped with a metal sheath or other similar type of shielded wrapping.

The metal sheaths of the power and neutral lines L and N are, in turn, twisted together so as to effectively form a single metal sheath S1 which surrounds power line L and neutral line N. Ground line G remains electrically isolated from power line L and neutral line N.

As will be discussed in detail below, safety circuit 1011 interrupts the flow of current through power line L and neutral line N extending between the power source and the load when an arcing condition occurs either between power line L and metal sheath S or between neutral line N and metal sheath S1. As can be appreciated, the presence of an arcing condition either between power line L and metal sheath S or between neutral line N and metal sheath S can result in a fire or other dangerous condition.

Safety circuit 1011 comprises a circuit breaker 13 which selectively opens and closes power line L and neutral line N. Circuit breaker 13 includes a first normally-closed switch K1 which is located in power line L between the power source and the load. Circuit breaker 13 also includes a second normally-dosed, switch K2 which is located in neutral line N between the power source and the load. Switches K1 and K2 can be positioned in either of two connective positions. Specifically, switches K1 and K2 can be positioned in either a first, or closed, position or a second, or open, position. With switches K1 and K2 disposed in their closed position, which is the opposite position as illustrated in FIG. 1, current is able to flow from the power source to the load. With switches K1 and K2 disposed in their open position, which is illustrated in FIG. 1, current is unable to flow from the power source to the load.

A metal-oxide varistor MOV1 protects against voltage surges in power and neutral conducting lines L and H. Metal-oxide varistor MOV1 preferably has a model number of Z151 and includes a first terminal 61 and a second terminal 63. First terminal 61 of metal-oxide varistor MOV1 is connected to power line L and second terminal 63 of metal-oxide varistor MOV1 is connected to neutral line N.

A solenoid SOL is ganged to the circuit breaker contacts of switches K1 and K2 and is responsible for selectively controlling the connective position of switches K1 and K2. Specifically, when solenoid SOL is de-energized, switches K1 and K2 remain in their closed positions. However, when solenoid SOL is energized, solenoid SOL moves and maintains switches K1 and K2 into their open positions. Solenoid SOL includes a winding 15 which includes a first end 17 and a second end 19, second end 19 being connected to power line L. It should be noted that safety circuit 1011 is not limited to the use of solenoid SOL to selectively move and maintain the connective position of switches K1 and K2. Rather, it is to be understood that solenoid SOL could be replaced with alternative types of circuit opening devices which are well known in the art without departing from the spirit of the present invention.

A first silicon controlled rectifier SCR1 acts to detect the presence of an arcing condition between the power line L and the metal sheath S1 and to switch solenoid SOL from its de-energized state to its energized state upon detecting the presence of the arcing condition between the power line L and the metal sheath S. First silicon controlled rectifier SCR1 preferably has a model number of ECI03B and includes an anode 21, a cathode 23 and a gate 25.

Diode bridge 1013 comprises four diodes D91, D92, D93 and D94, each diode preferably having a model number of IN4004. Diode D91 includes an anode 1015 connected to cathode 23 of silicon controlled rectifier SCR1 and a cathode 1017 connected to first end 17 of solenoid SOL. Diode D92 includes an anode 1019 connected to cathode 1017 of diode D91 and a cathode 1021 connected to anode 21 of silicon controlled rectifier SCR1. Diode D93 includes an anode 1023 connected to neutral line N at the power source and a cathode 1025 connected to anode 21 of silicon controlled rectifier SCR1. Diode D94 includes an anode 1027 connected to cathode 23 of silicon controlled rectifier SCR1 and a cathode 1029 connected to neutral line N at the power source.

In use, diode bridge 1013 in safety circuit 1011 acts to detect the presence of an arcing, condition between neutral line N and metal sheath S1 and to switch solenoid SOL from its de-energized state to its energized state upon detecting the presence of the arcing condition between neutral line N and metal sheath S1. Voltage dropping resistor R21 preferably has a value of approximately 15 Kohms. Diode 022 is preferably model number of IN4148. Capacitor C21 preferably has a value of approximately 0.22 uF. A pair of nuisance tripping resistors R22 and R23 preferably have a value of approximately 330 ohms. Resistor R22 is connected in parallel with capacitor C21 and protection diode D22, with one of its terminals connected to gate 25 of first rectifier SCR1. In use, resistor R22 serves to reduce the likelihood of nuisance tripping in rectifiers SCR1 and diode bridge 1013.

An indicator circuit 213 is included connecting power line L to neutral line N at a location between sheath S1 and circuit breaker 13. Indicator circuit 213 comprises a light emitting diode (LED) D25, a current limiting resistor R24 and a protection diode D26 which are connected in Series. Preferably, current limiting resistor R24 has a value of approximately 33 Kohms and protection diode D26 has a model number of IN4004. In use, indicator circuit 213 serves to provide a visual indication (i.e., a light) when power is being applied to the load.

A test circuit 215 is included in safety circuit 1011, test circuit 215 connecting power line L (at a location between sheath S1 and circuit breaker 13) to R21. Test circuit 215 comprises a test switch TEST and a resistor R25 which are connected in series. Preferably, resistor R25 has a value of approximately 33 Kohms. In use, test circuit 215 allows the user to test whether safety circuit 1011 is operating properly.

In use, safety circuit 1011 functions in the following manner. In the absence of arcing conditions, switches K1 and K2 are disposed in their normally-closed positions, thereby enabling AC power to pass from the power source to the load through power and neutral lines L and N. Upon the presence of an arcing condition between power line L and metal sheath S, leakage voltage travels from metal sheath S and passes through resistor R21, resistor R21 dropping the leakage voltage to an acceptable level.

Diode bridge 1013 in safety circuit 1011 acts to detect the presence of an arcing condition between neutral line N and metal sheath S1 and to switch solenoid SOL from its de-energized state to its energized state upon detecting: the presence of the arcing condition between neutral line N and metal sheath S1.

A first silicon controlled rectifier SCR1 acts to detect the presence of an arcing condition between the power line L and the metal sheath S1 and to switch solenoid SOL from its de-energized state to its energized state upon detecting the presence of the arcing condition between the power line L and the metal sheath S1.

It should be noted that safety circuit 1011 differs from conventional electrical safety devices in that fireguard 1011 does not comprise a differential transformer rendering the fireguard circuit 1011 more compact in size and less expensive to manufacture than conventional electrical safety devices which utilize a differential transformer.

Figure 2:
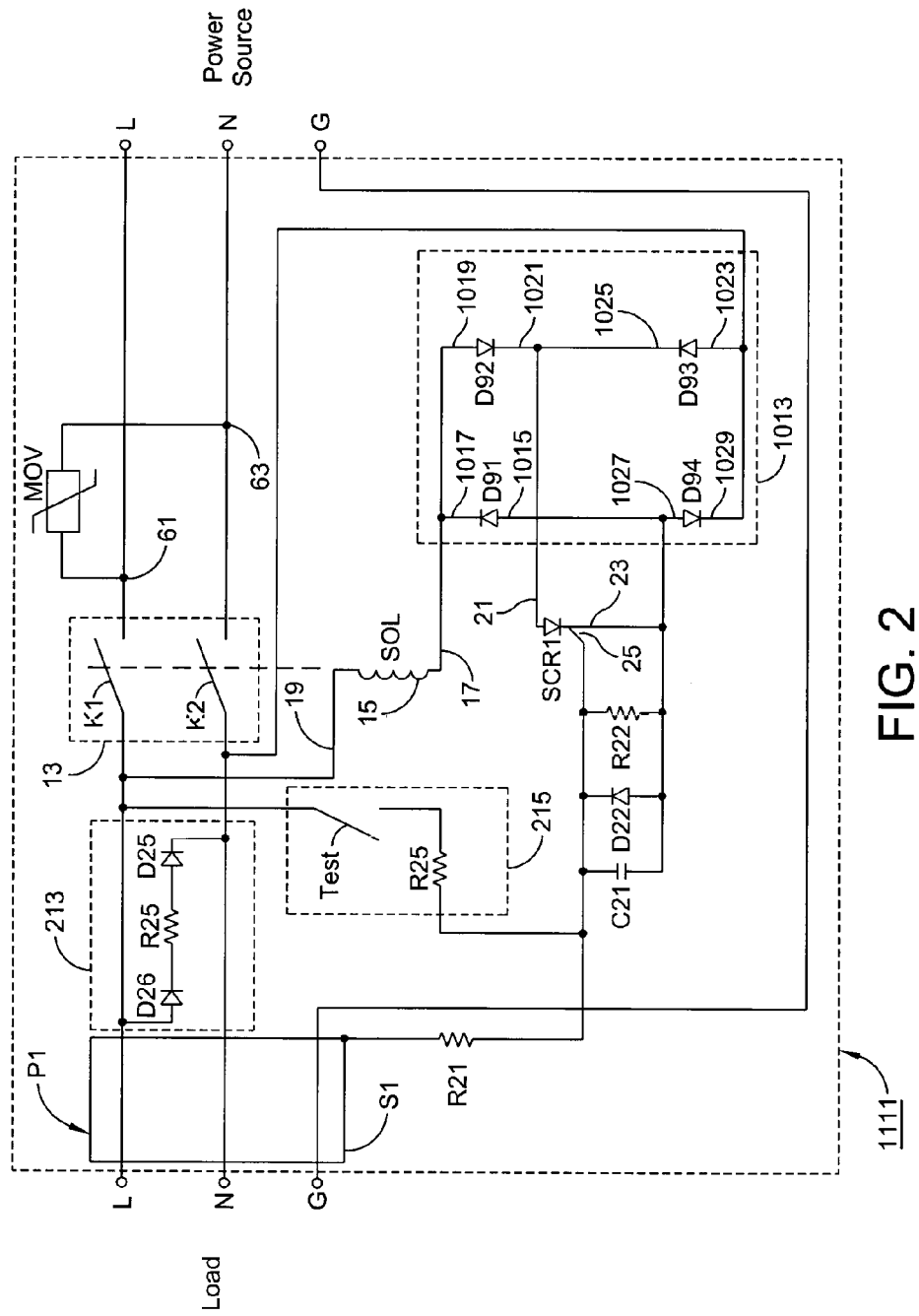
FIG. 2 is another schematic circuit diagram of an embodiment of a safety circuit used in the LCDI of the present invention.

Referring now FIG. 2, there is shown a second embodiment of a safety circuit constructed according to the teachings of the present invention, the safety circuit being represented generally by reference numeral 1111. Safety circuit 1111 is identical in all respects with safety circuit 1011 with one notable exception: the power connections for solenoid SOL and the sensing circuitry are derived from the output side the load) rather than from the input side (i.e., the power source). Specifically, second end 19 of winding 15 for solenoid SOL is connected to power line L at a location between sheath S1 and circuit breaker 13. In addition, anode 1023 of diode D93 and cathode 1029 of diode D94 are connected to neutral line N at a location between sheath S1 and circuit. breaker 13.

Figure 3:
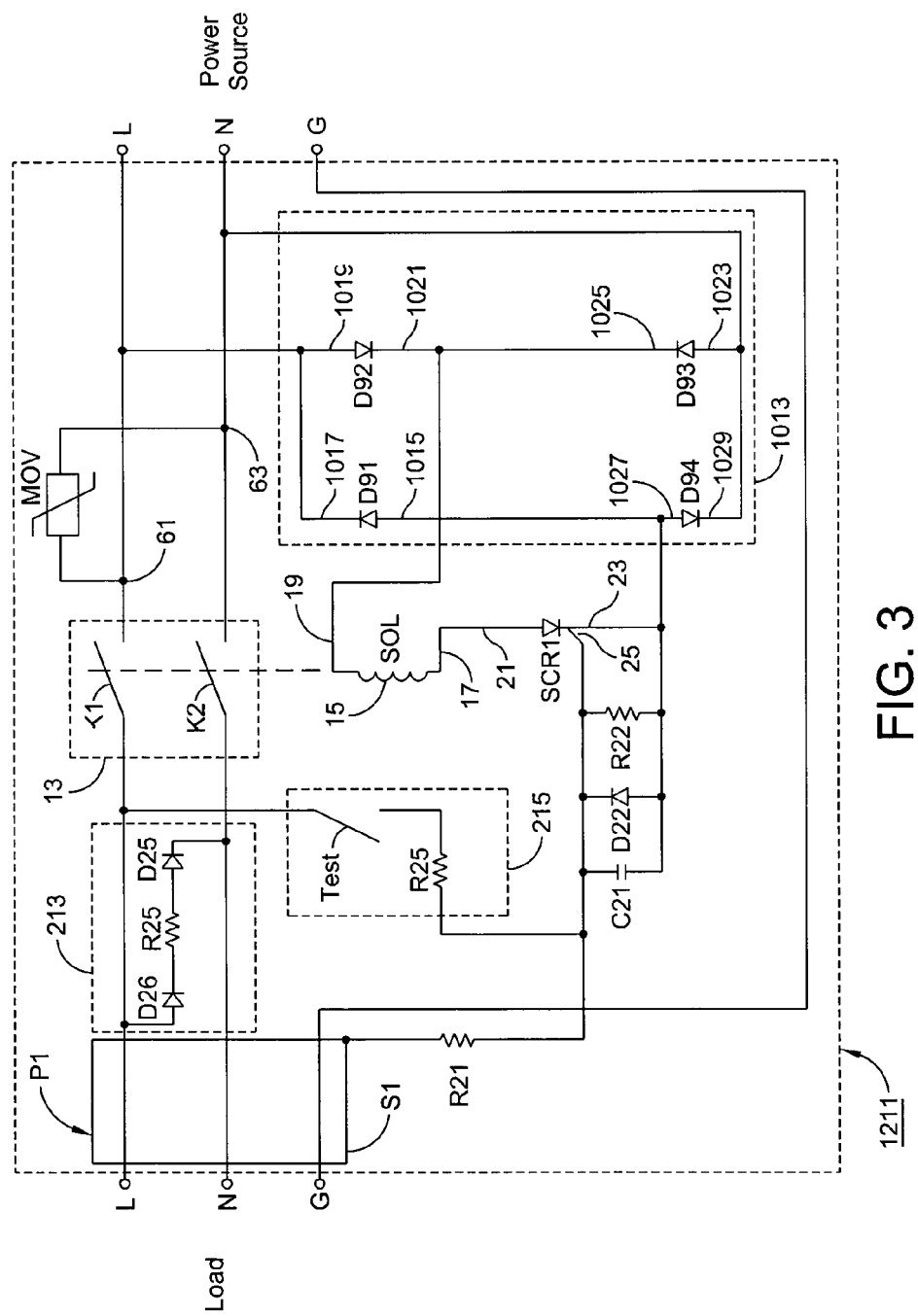
FIG. 3 is another schematic circuit diagram of an embodiment of a safety circuit used in the LCDI of the present invention.

Referring now FIG. 3, there is shown a third embodiment of a safety circuit constructed according to the teachings of the present invention, the safety circuit being represented generally by reference numeral 1211 Safety circuit 1211 is substantially similar in construction to safety circuit 1011. The principal distinction between safety circuit 1211 and safety circuit 1011 is that, in safety circuit 1211, solenoid SOL is connected directly to silicon controlled rectifier SCR1 whereas, in safety circuit 1011, solenoid SOL is connected indirectly to silicon controlled rectifier SCR1 through diode bridge 1013. Specifically, in safety circuit 1211, first end 17 of the winding for solenoid SOL is connected to anode 21 of silicon controlled rectifier SCR1 and second end 19 of the winding for solenoid SOL is connected to cathode 1021 of diode D92. Furthermore, diode bridge 1013 is directly connected to the input side (i.e., the power source) of power line L and neutral line N, with anode 1019 of diode D92 connected to power line L at the power source and anode 1023 of diode D93 connected to neutral line N at the power source.

Figure 4:
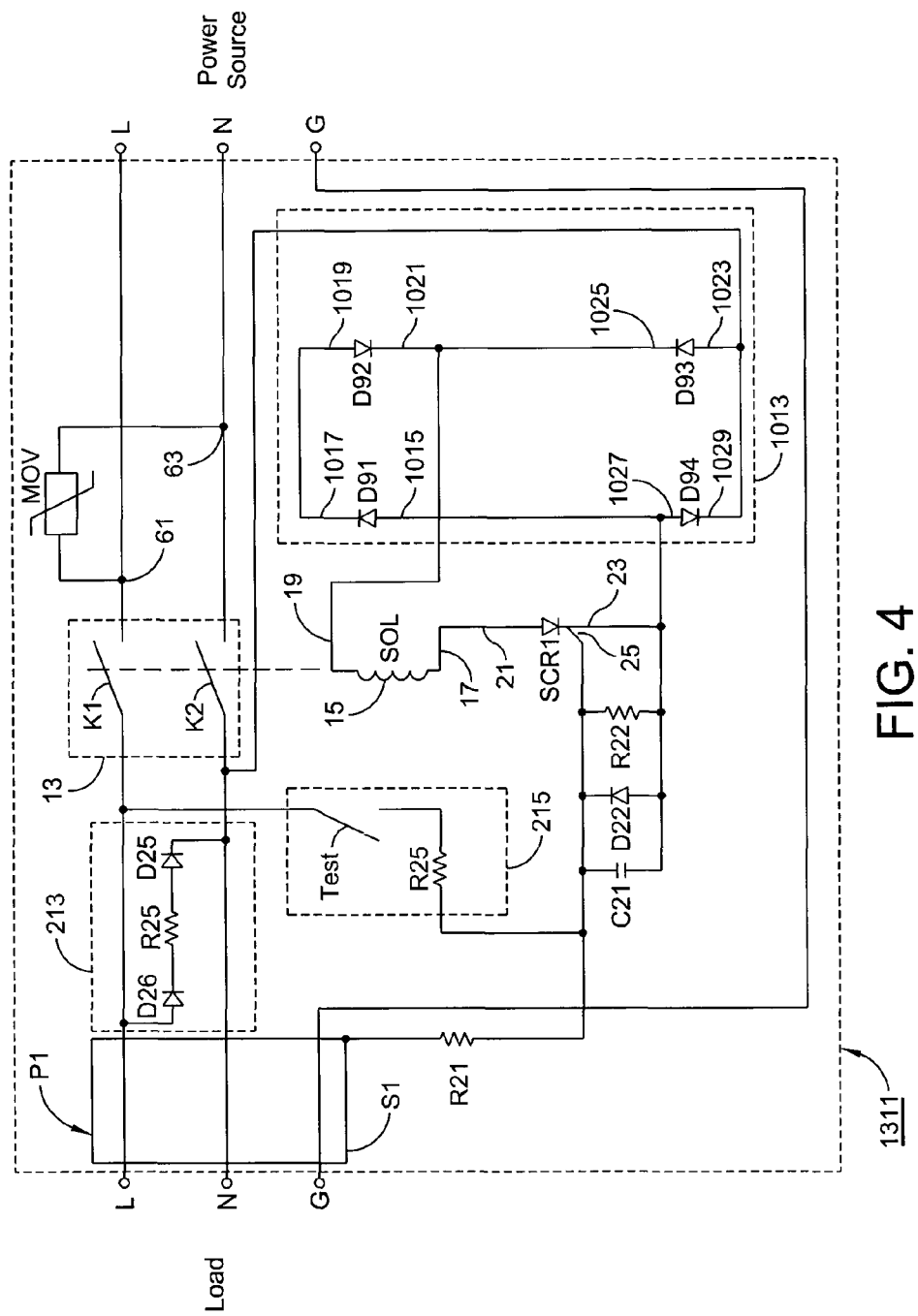
FIG. 4 is another schematic circuit diagram an embodiment of a safety circuit used in the LCDI of the present invention.
Figure 5:
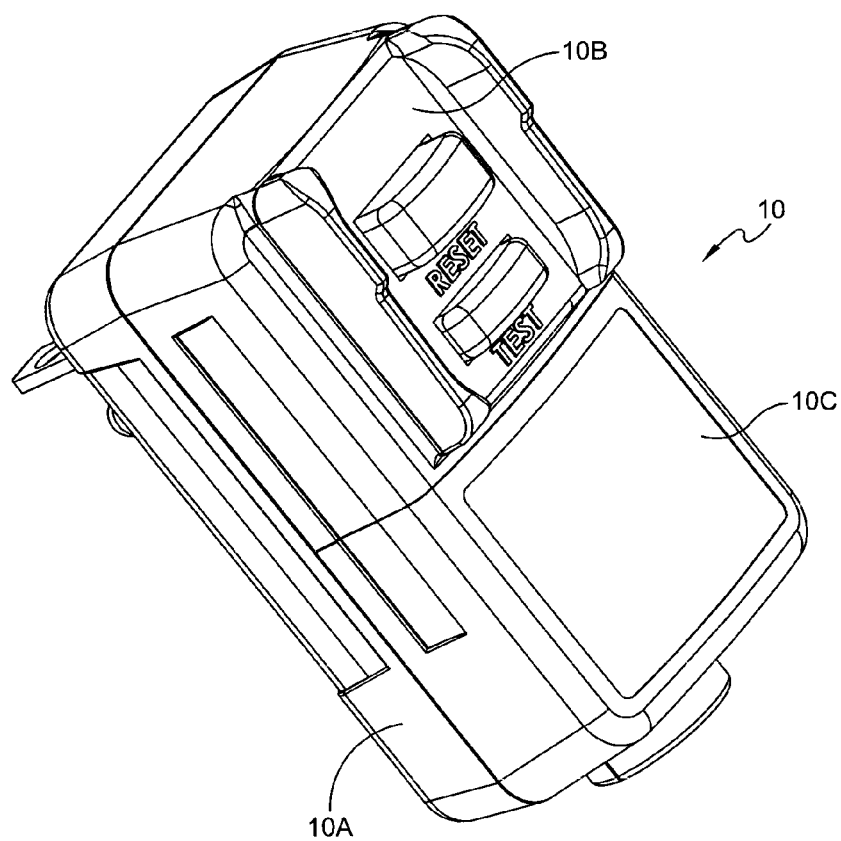
FIG. 5 is a perspective top view of an LCDI enclosure employing the principles of subject invention.

Referring now FIG. 4, there is shown a fourth embodiment of a safety circuit constructed according to the teachings of the present invention, the fireguard circuit being represented generally by reference numeral 1311. Safety circuit 1311 is identical in all respects with safety circuit 1211 with one notable exception: the power connections for diode bridge 1013 are derived from the output side (i.e., the load) rather than from the input side (i.e., the power source). Specifically, anode 1019 of diode D92 is connected to power line L at its output side and anode 1023 of diode D93 is connected to neutral line N at its output side.

Figure 6:
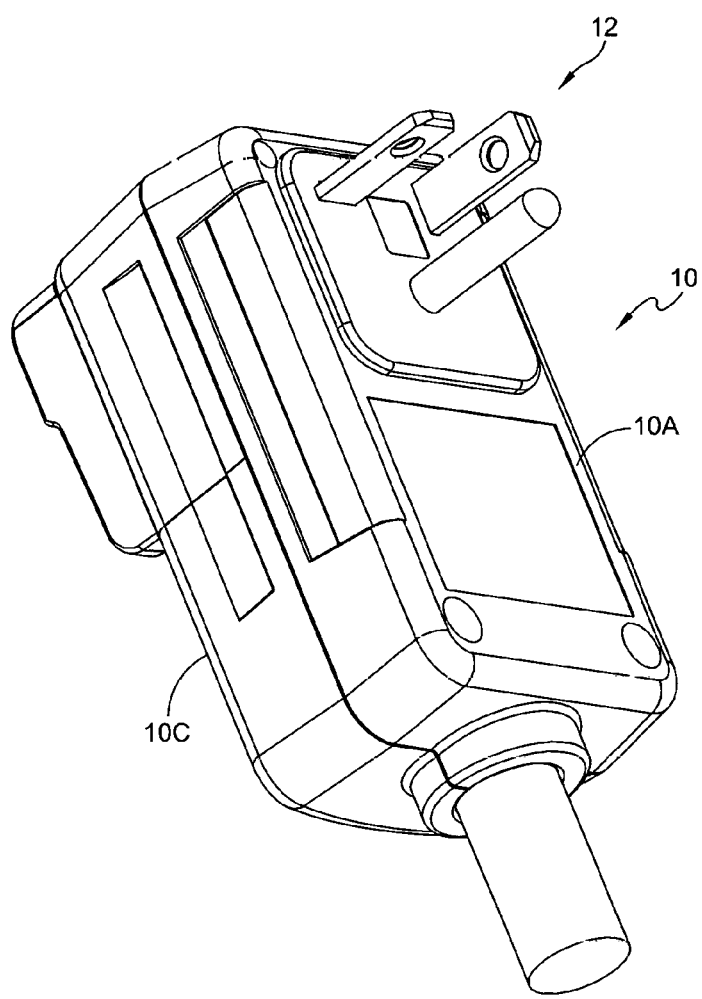
FIG. 6 is a perspective bottom view of an LCDI enclosure with 240 Volt 20 Amp source conductors employing the principles of subject invention.
Figure 7:
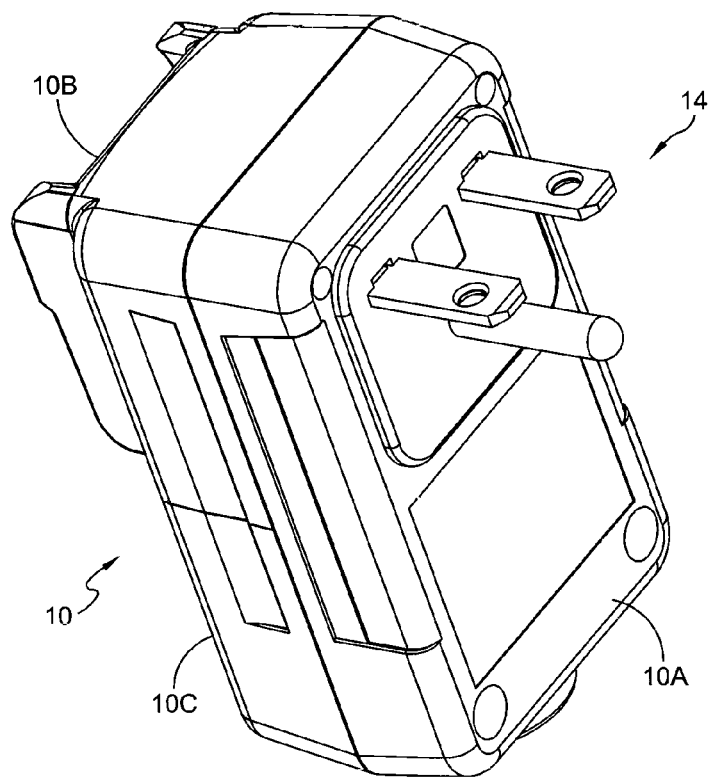
FIG. 7 is a perspective bottom view of an LCDI enclosure with 240 Volt 15 Amp source conductors employing the principles of subject invention.
Figure 8:
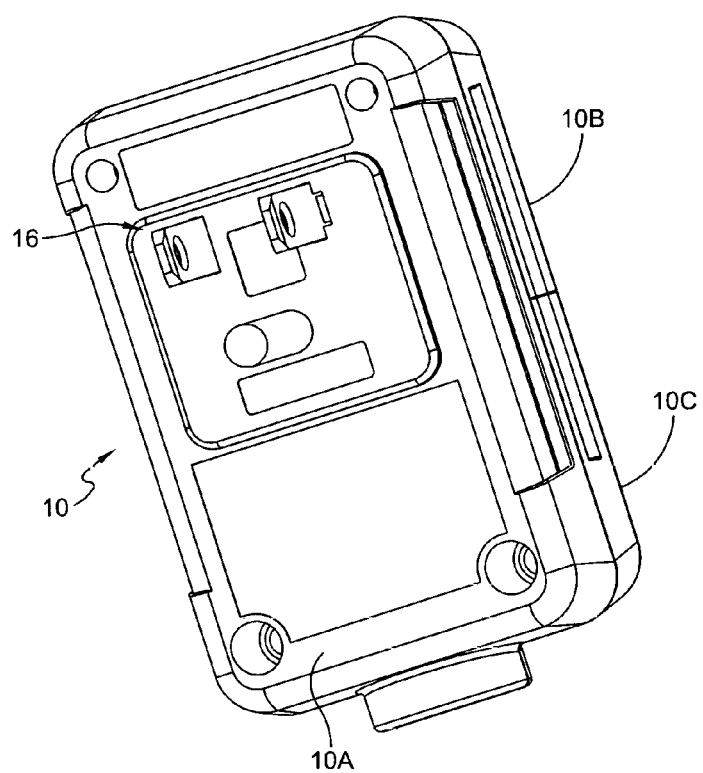
FIG. 8 is a perspective bottom view of an LCDI enclosure with 120 Volt source conductors employing the principles of subject invention.

FIGS. 5-8 illustrate the external housings used to encase the circuit card assemblies 20 illustrated in FIGS. 9-16. External Housing 10 includes bottom cover 10A, a top cover 10B, and a wire cover 10C. As illustrated in FIGS. 6-8, the LCDI of the present invention is adaptable to support a variety of source input prong assemblies including 240 20A prongs 12, 240 15 A prongs 14, and 120 Volt prongs 16.

Figure 9:
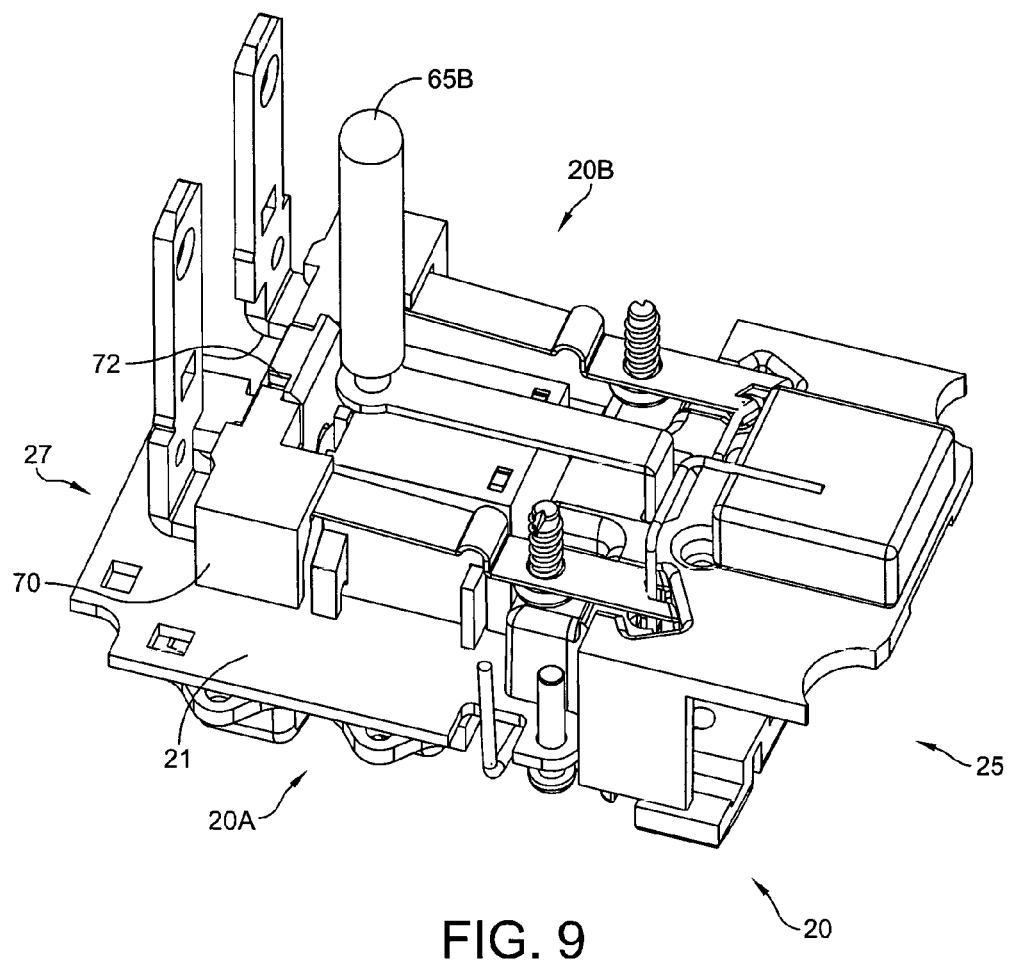
FIGS. 9 through 13 illustrate a circuit assembly for an LCDI employing the principles of subject invention.
Figure 10:
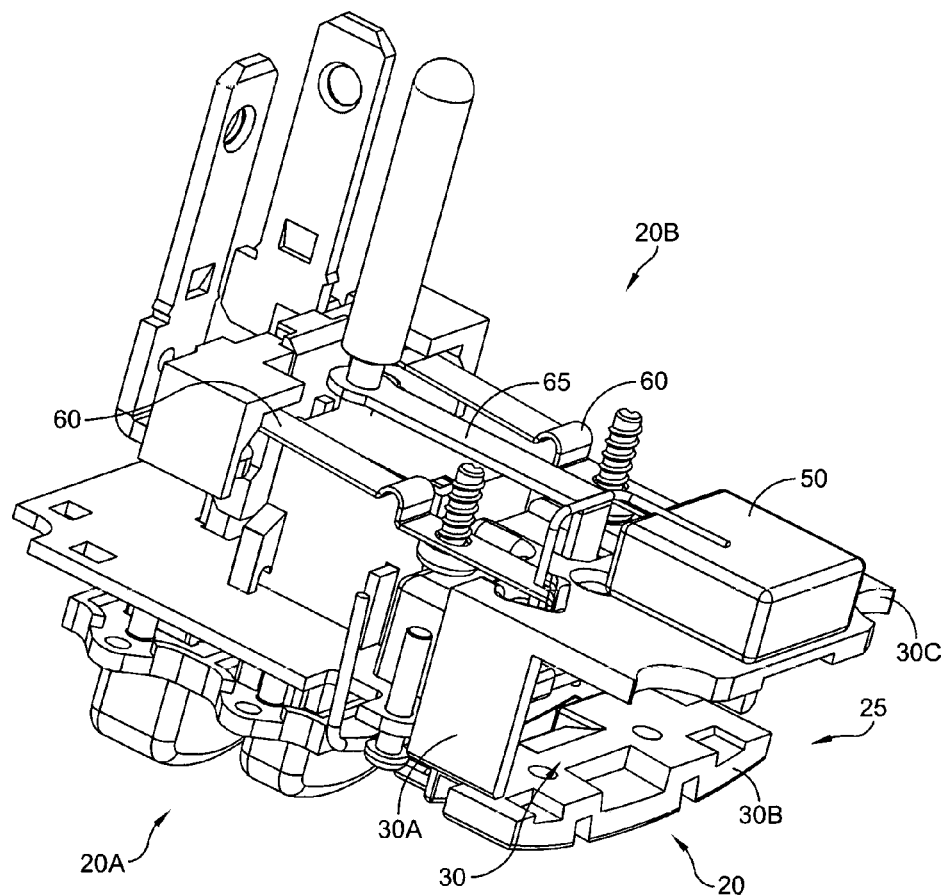
Figure 14:
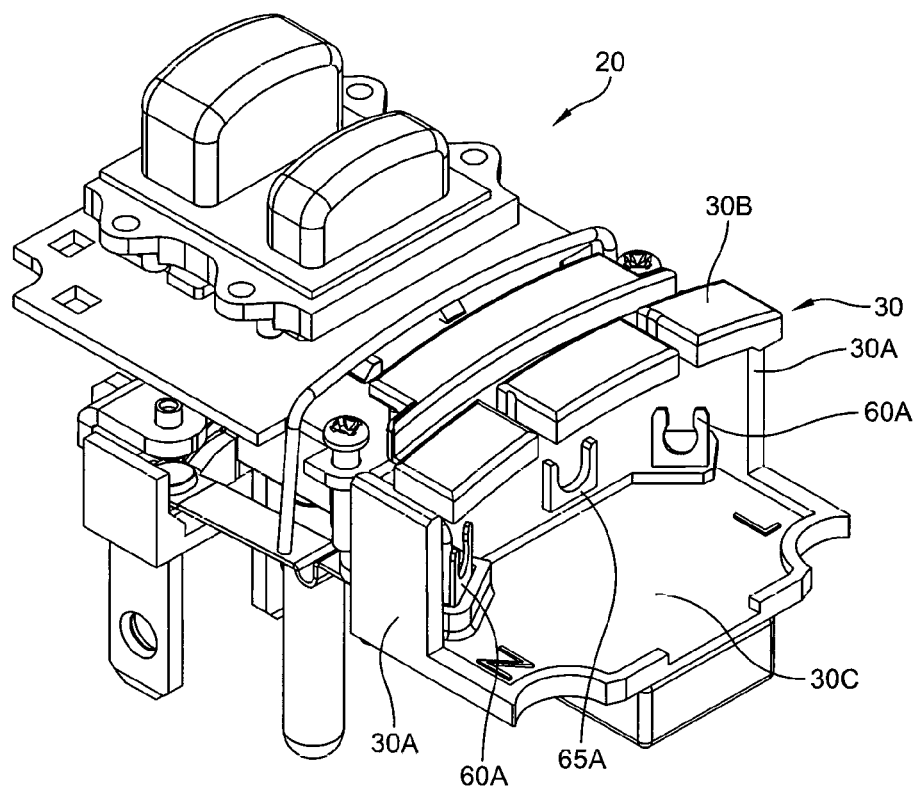
FIG. 14 illustrates a circuit card assembly mounted in a bottom LCDI housing employing the principles of subject invention.

FIG. 9 illustrates a circuit card assembly 20 having a top side 20A, a bottom side 20B, a load input section 25 and a source input section 27, the load input section 25 and source input section 27 positioned at opposite ends of circuit board 21. Referring to FIG. 10 and FIG. 14 a Load Input section 25 includes a cavity 30, positioned on circuit board 21, formed by sidewalk, 30A, top wall 30B, and bottom wall 30C. Cavity 30 serves as a containment barrier for arcing conditions occurring either between power line L and metal sheath S1 or between neutral line N and metal sheath S1 that could result in a fire or other dangerous condition. Referring to FIG. 1-4, Cavity 30 encases load input conductors terminals L, N, and G, and sheathing S1. Cavity 30 can be made from any suitable fire retardant material having material properties with flame ratings in accordance with Underwriters Laboratories (UL) 94 flame rating data. In the preferred embodiment, suitable materials such as phenolic and VALOX manufactured by SABIC Corp. are utilized.

In the preferred embodiment, MOV 50 is mounted on bottom side 20B on the surface of bottom wall 30C. Movable contact arms 60 extend from a first load contact end 60A located within cavity 30, thru bottom wall 30C, and extending to a second source contact end 60B (FIG. 11, FIG. 12) located at the source input section 27. A ground conductor 65 extends from a first load contact end 65A, thin bottom wall 30C, and extending to a second source contact end 65B located at the source input section 27.

Figure 11:
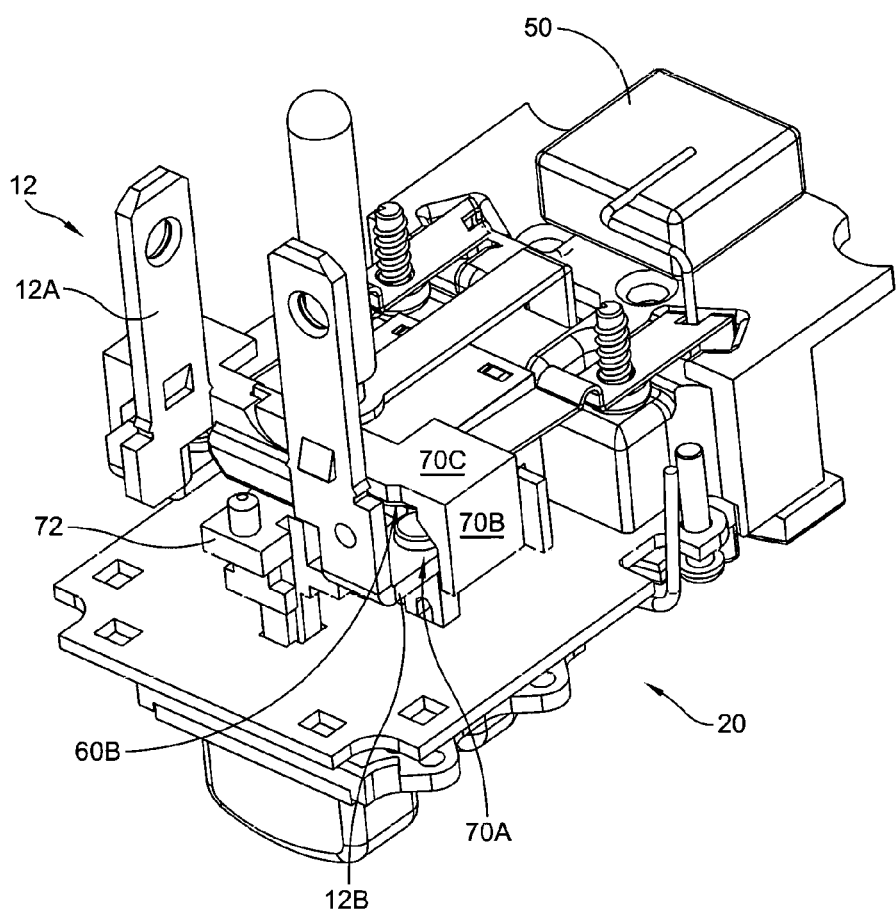

Movable contact arms 60 are resiliently flexible and include at the source input section 27, an actuating member 70, and latch 72 to reciprocate second source contact end 60B. Referring to FIG. 11, source contact prong assembly 12 includes line and Neutral conductors having an outlet end 12A and a circuit end 12B. Actuating member 70 includes a cavity 70A positioned on circuit board 21 for isolation and containment of both source contact prong 12 circuit end 12B and movable contact arm 60 source contact end 60B. Cavity 70A provides containment of arcing conditions occurring either between power line L and metal sheath S or between neutral line N and metal sheath S that could result in a fire or other dangerous condition. Referring to Circuits 1-4, cavity 70A contains switches K1 and K2. Cavity 70A can be made from any suitable fire retardant material having material properties with flame ratings in accordance with the Underwriters Laboratories (UL) 94 flame rating data. In the preferred embodiment, suitable materials such as phenolic and VALOX manufactured by SABIC Corp. are utilized.

Figure 11A:
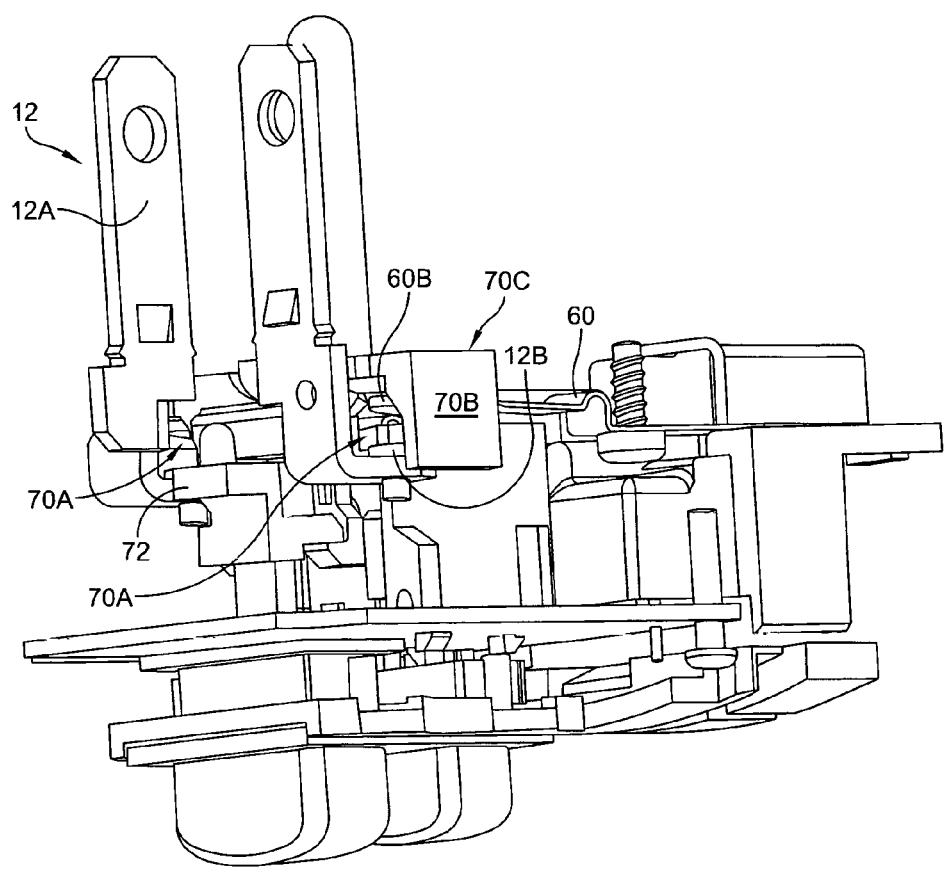
FIG. 11A illustrates an exploded view of FIG. 11.
Figure 12:
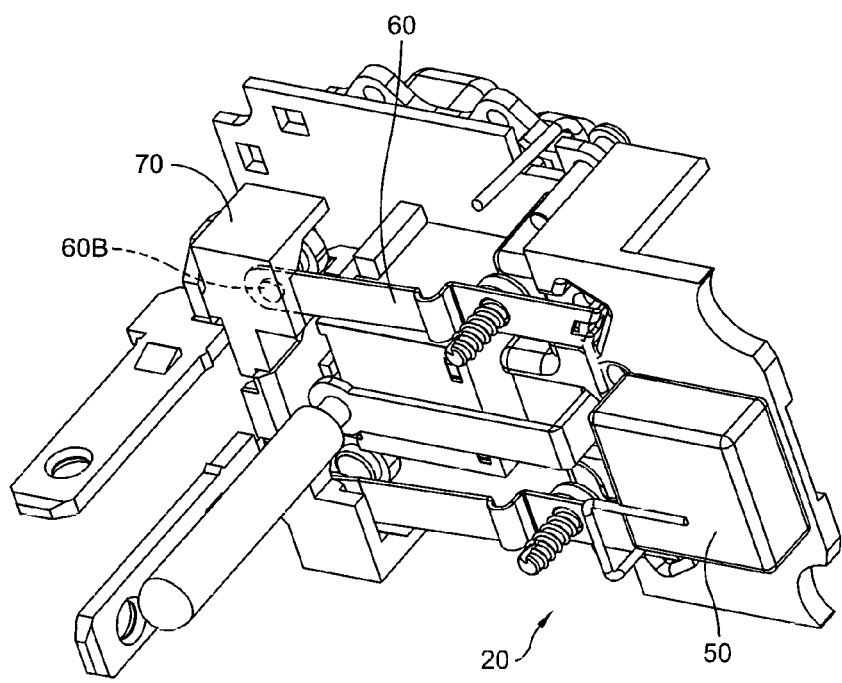
Figure 13:
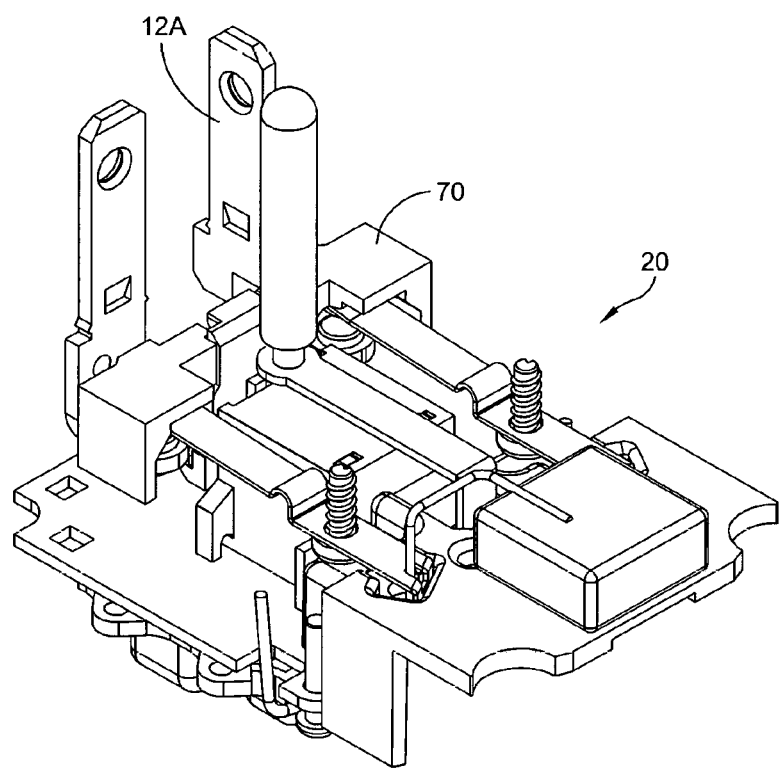

Referring to FIG. 14, circuit card assembly 20 is fitted in bottom cover 10A. Bottom cover 10A includes openings for the passage and securement of source contact prongs 12 thereby ensuring a fixed placement of circuit end 12B within cavity 70A, and further ensures the fixed placement of ground conductor 65. Referring to FIG. 11A, Cavity 70A includes sidewalls 70B and a top wall 70C. When fitted in bottom cover 10A, top wall 70C isolates movable contact arm 60 source contact end 60B from contacting the interior of bottom cover 10A.

Figure 15:
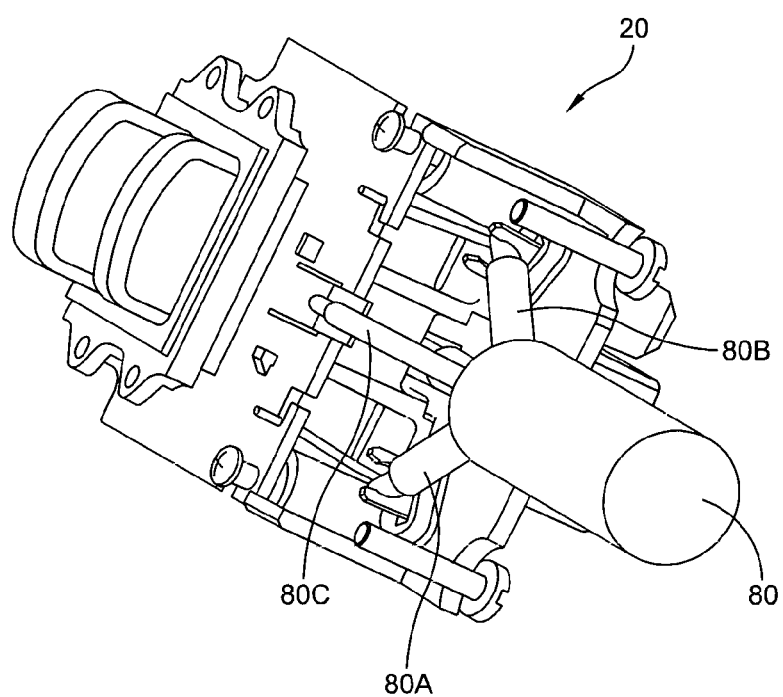
FIGS. 15 and 16 illustrate a circuit card assembly having a connected load input cable employing the principles of subject invention.
Figure 16:
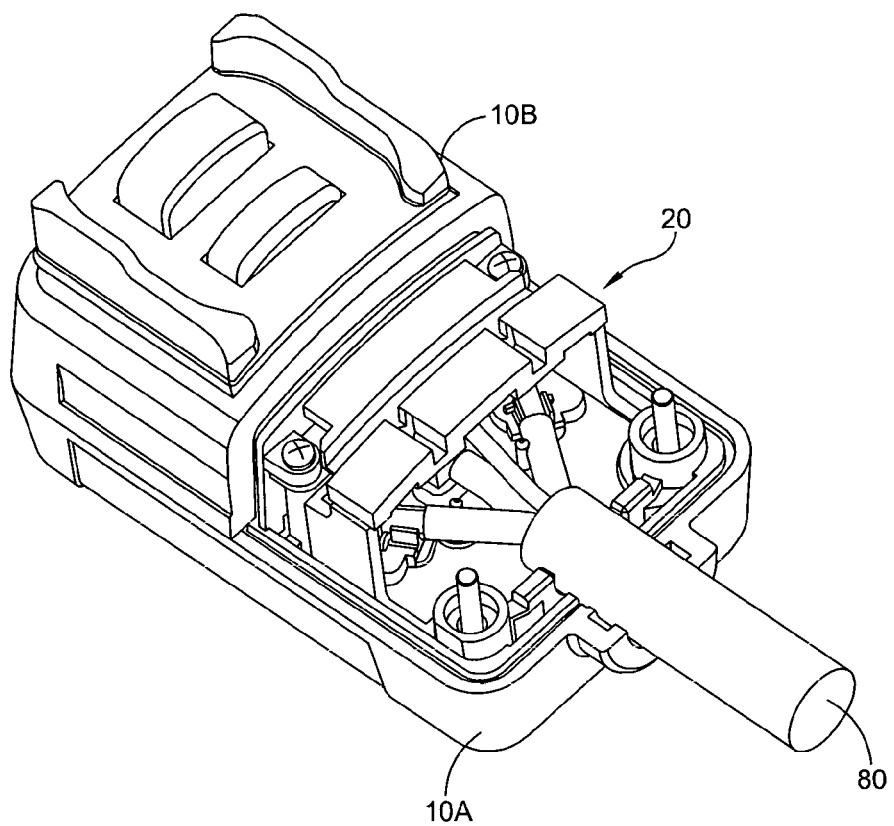

Referring to FIGS. 15 and 16, load input cable 80 includes a power line 80A, a neutral line 80B, and a metal sheath 80C line that forms a single metal sheath S1 which surrounds power line L and neutral line N. Ground line 65 remains electrically isolated from power line 80A and neutral line 80B. FIG. 16 further illustrates the removal of wire cover 10C for easy access and quick connection of load types.

The embodiments shown of the present invention are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A leakage current detection and interruption (LCDI) device, for use as a safety device for a load cable, said load cable connecting a power source with a load, said load cable comprising a power line, a neutral line and a metal sheath which surrounds the power line and the neutral line, said LCDI device comprising a circuit card assembly adaptable for positioning within an external housing, the housing having a top cover, a bottom cover and a wire cover, the LCDI device comprising:
    a circuit card assembly having a top, bottom, a load input section, and a source input section, said circuit card assembly further including a circuit board, said load input section including a containment cavity formed on one end of said circuit board, the containment cavity including a plurality of walls to surround said load input conductors;
    said source input section including an actuating member positioned on the opposite end of said circuit board, said actuating member including a plurality of containment cavities therein, said actuating member containment cavities including a plurality of walls, said source input section further including a plurality of conductors having a first end and a second end, said first end for engagement into a power source, said second end surrounded by said plurality of walls of said plurality of containment cavities;
    a plurality of movable contact arms, said movable contact arms having at one end, load contacts, and at the opposite end source contacts, said load contacts surrounded by said load input section containment cavity plurality of walls, said source contact surrounded by said plurality of walls of said plurality of containment cavities, said source contacts of said plurality of movable contact arms and said second end of said plurality of source input conductors adaptable for engagement and disengagement when said LCDI is operable;
    wherein said load input containment cavity and said actuating member containment cavities are included as part of said circuit card assembly, said circuit card assembly adapted for fitment within said external housing.

2. A leakage current detection and interruption (LCDI) device as in claim 1, wherein said load input containment cavity plurality of walls includes a top wall, a bottom wall, and a plurality of side walls.

3. A leakage current detection and interruption (LCDI) device as in claim 2, wherein said bottom wall includes a plurality of openings, said load contacts positioned through said plurality of openings into said load input section containment cavity.

4. A leakage current detection and interruption (LCDI) device as in claim 2, wherein said bottom wall includes a side interior to said containment cavity, and a side exterior to said containment cavity, said exterior side further including a Metal Oxide Varistor (MOV) positioned thereon.

5. A leakage current detection and interruption (LCDI) device as in claim 1, wherein said plurality of movable contact arms are resiliently flexible.

6. A leakage current detection and interruption (LCDI) device as in claim 5, wherein said plurality of walls of said actuating member containment cavities include a plurality of sidewalls and a top wall, said top wall having a side interior to said plurality of actuating member containment cavities, and a side exterior to said plurality of said actuating member containment cavities, said source contact end of said plurality of resiliently flexible movable contact arms, when biased in the normally open position, being in engagement with said interior side of said top wall of said plurality of actuating member containment cavities.

7. A leakage current detection and interruption (LCDI) device as in claim 4, wherein said circuit card assembly further includes a solenoid positioned on said bottom of said circuit card assembly, between said load input section and said source input section.

8. A leakage current detection and interruption (LCDI) device as in claim 7, wherein said plurality movable contact arms extend longitudinally from said source contact to said load contact adjacent to said solenoid.

9. A leakage current detection and interruption (LCDI) device as in claim 1, wherein said circuit card assembly further includes:
    a) a circuit breaker comprising a first switch located in one of said lines between the power source and the load, said switch having a first position in which the power source in its associated line is connected to the load and a second position in which the power source in its associated line is not connected to the load, (b) a circuit opening device for setting said switch in either its first position or its second position, said circuit opening device being operable in either a first state or a second state, said circuit opening device setting said switch in its first position when in its first state and said circuit opening device setting said switch in its second position when in its second state, (c) a first silicon controlled rectifier (SCR) for detecting the presence of an arcing condition between one of said lines and the metal sheath, said first SCR setting said circuit opening device at its second state upon detecting the presence of an arcing condition between one of said lines and the metal sheath, said first SCR comprising an anode, a cathode and a gate, and (d) a diode bridge connecting the first SCR to the circuit opening device, the diode bridge acting to detect the presence of an arcing condition between the other of said lines and the metal sheath, said diode bridge setting said circuit opening device at its second state upon detecting the presence of an arcing condition between the other of said lines and the metal sheath.

10. A leakage current detection and interruption (LCDI) device as in claim 9, wherein the power connections for said circuit opening device, said first SCR and said diode bridge are derived from said power and neutral lines at the load.

11. A leakage current detection and interruption (LCDI) device as in claim 9, wherein the power connections for said circuit opening device, said first SCR and said diode bridge are derived from said power and neutral lines at the power source.

12. A leakage current detection and interruption (LCDI) device as in claim 8, wherein said external housing, comprises a top cover, a bottom cover, and a wire cover, said bottom cover having an interior surface and an exterior surface, wherein said actuating member, said MOV, said movable contact arms, and said solenoid are positioned facing said bottom cover interior surface, said bottom cover further including openings for the passage of said source input plurality of conductors through said exterior surface.

13. A leakage current detection and interruption (LCDI) device as in claim 12, wherein said plurality of conductors passing through said exterior surface are selected from the group comprising 240 Volt 20 Amp conductors, 240 Volt 15 Amp conductors, and 120 Volt conductors.

14. A leakage current detection and interruption (LCDI) device as in claim 1, wherein said plurality of actuating member containment cavities and said load input containment cavity is made from a fire retardant material.

15. A leakage current detection and interruption (LCDI) device as in claim 1, wherein said load input section containment cavity plurality of walls are covered by said wire cover when said circuit card assembly is fitted within said external housing.

16. A leakage current detection and interruption (LCDI) device as in claim 1, wherein said plurality of walls of said actuating member containment cavities are covered by said top cover when said circuit card assembly is fitted within said external housing.

* * * * *